Inventor:
Eugene A. Odin
By John Howard McElroy
his Attorney

July 2, 1940.　　　　　E. A. ODIN　　　　　2,206,467
SUPPORTING MECHANISM
Filed May 3, 1937　　　　　5 Sheets-Sheet 3
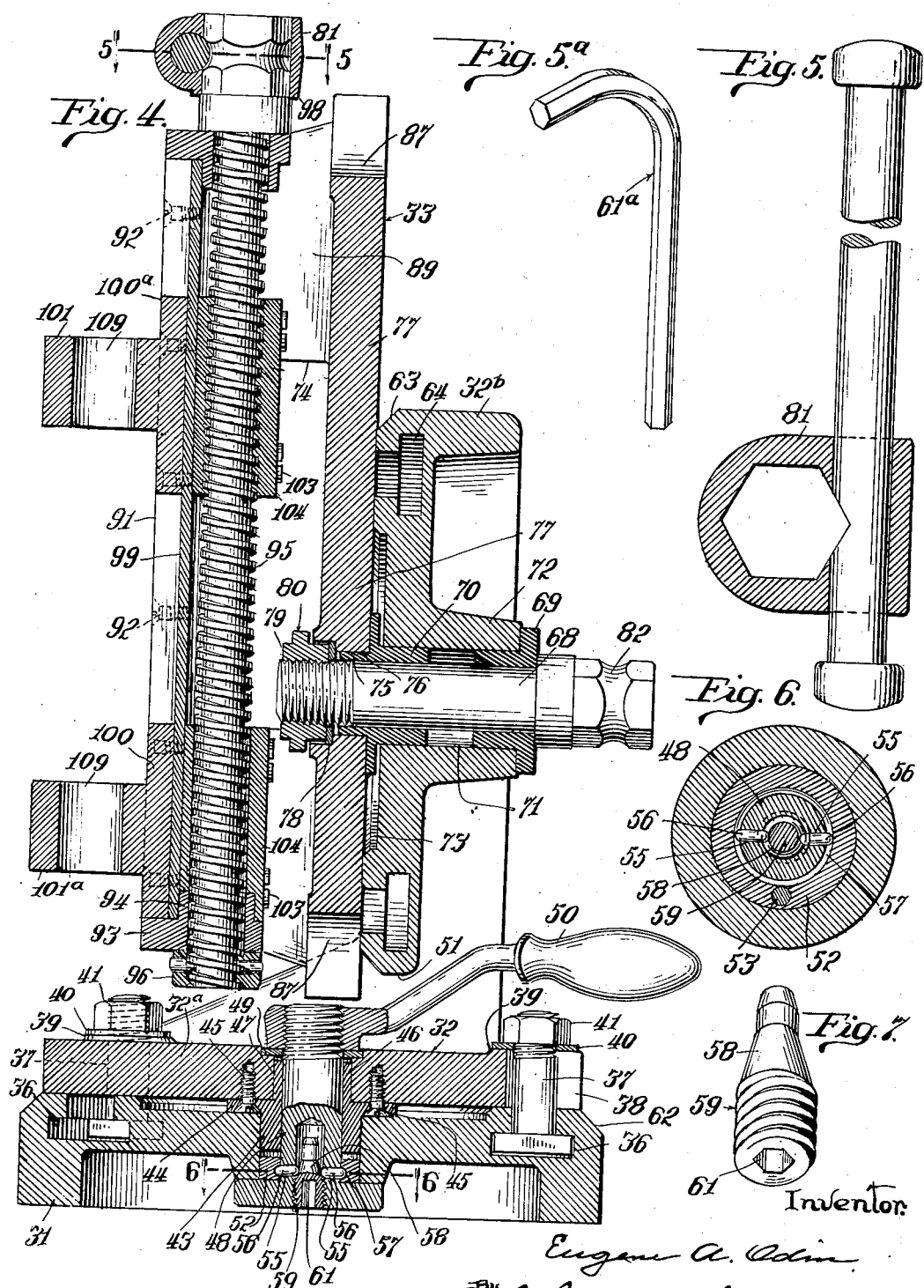
Inventor
Eugene A. Odin
By John Howard McElroy
his Attorney July 2, 1940.  E. A. ODIN  2,206,467
SUPPORTING MECHANISM
Filed May 3, 1937  5 Sheets-Sheet 4

Inventor:
Eugene A. Odin
By John Howard McElroy,
his Attorney

July 2, 1940.  E. A. ODIN  2,206,467
SUPPORTING MECHANISM
Filed May 3, 1937   5 Sheets-Sheet 5
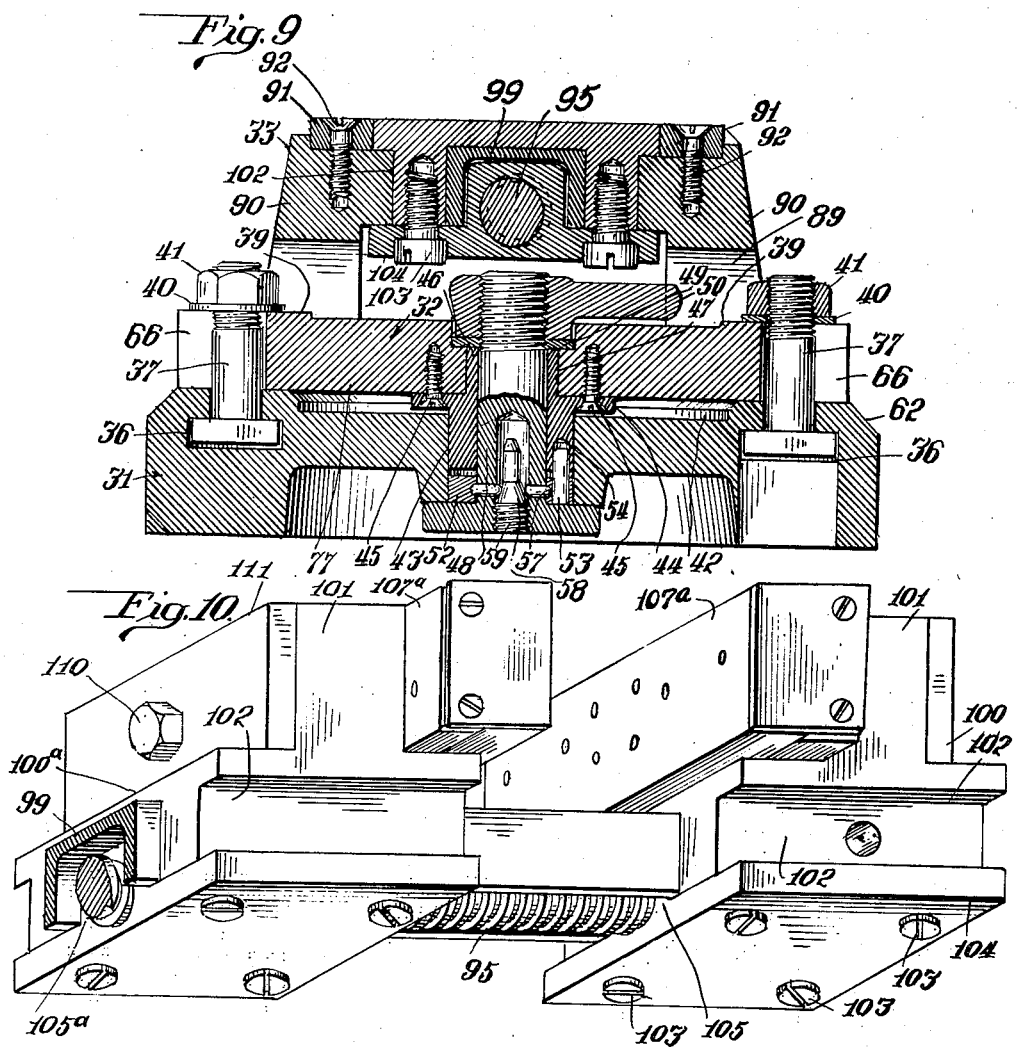
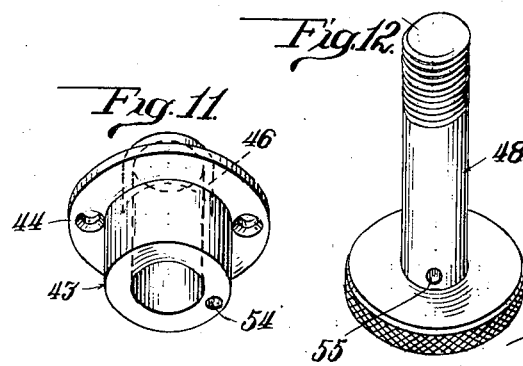
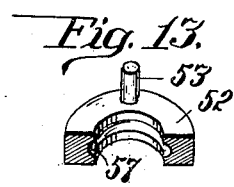

Patented July 2, 1940

2,206,467

UNITED STATES PATENT OFFICE 2,206,467

SUPPORTING MECHANISM

Eugene A. Odin, Chicago, Ill., assignor, by mesne assignments, to National Triangle Securities, Inc., Chicago, Ill., a corporation of Delaware Application May 3, 1937, Serial No. 140,460

5 Claims. (Cl. 81—41)

My invention is concerned with a novel adjustable supporting mechanism designed primarily for use in connection with a universal vise that is designed to hold work securely at any desired angle in any desired position upon milling, drilling, grinding, and like machinery and is designed to produce a device of the class described that can be easily adjusted and manipulated and which will hold the work with the utmost accuracy and precision and that will be durable. To this end it consists of certain novel combinations of elements, all as will be fully described in the following specification and particularly pointed out in the claims.

To illustrate my invention I annex hereto five sheets of drawings in which the same reference characters are used to designate identical parts in all the figures, of which:

Fig. 1 is a front elevation, partially in section of my complete mechanism associated with a vise;

Figs. 2 and 3 are horizontal sections on the lines 2—2 and 3—3 respectively, of Fig. 1;

Fig. 4 is a central vertical section on the line 4—4 of Fig. 1;

Fig. 5 is a detail in section on the line 5—5 of Fig. 4 showing a detachable handle for the device;

Fig. 5a is a perspective view of a tool used in assembling some of the parts;

Fig. 6 is a detail on a larger scale in section on the line 6—6 of Fig. 4;

Fig. 7 is a locking bolt detached and seen in perspective;

Fig. 9 is a vertical cross-section on the line 9—9 of Fig. 8;

Fig. 10 is a perspective view of the jaw supporting members with one form of the jaws in place;

Fig. 11 is a perspective view, detached, of a tubular stud seen in place and in section in Figs. 4 and 9;

Fig. 12 is a similar perspective view of a bolt cooperating therewith; and

Fig. 13 is a perspective view cut in half, of a locking collar interposed between the stud shown in Fig. 11 and the bolt shown in Fig. 12.

Figure 1:
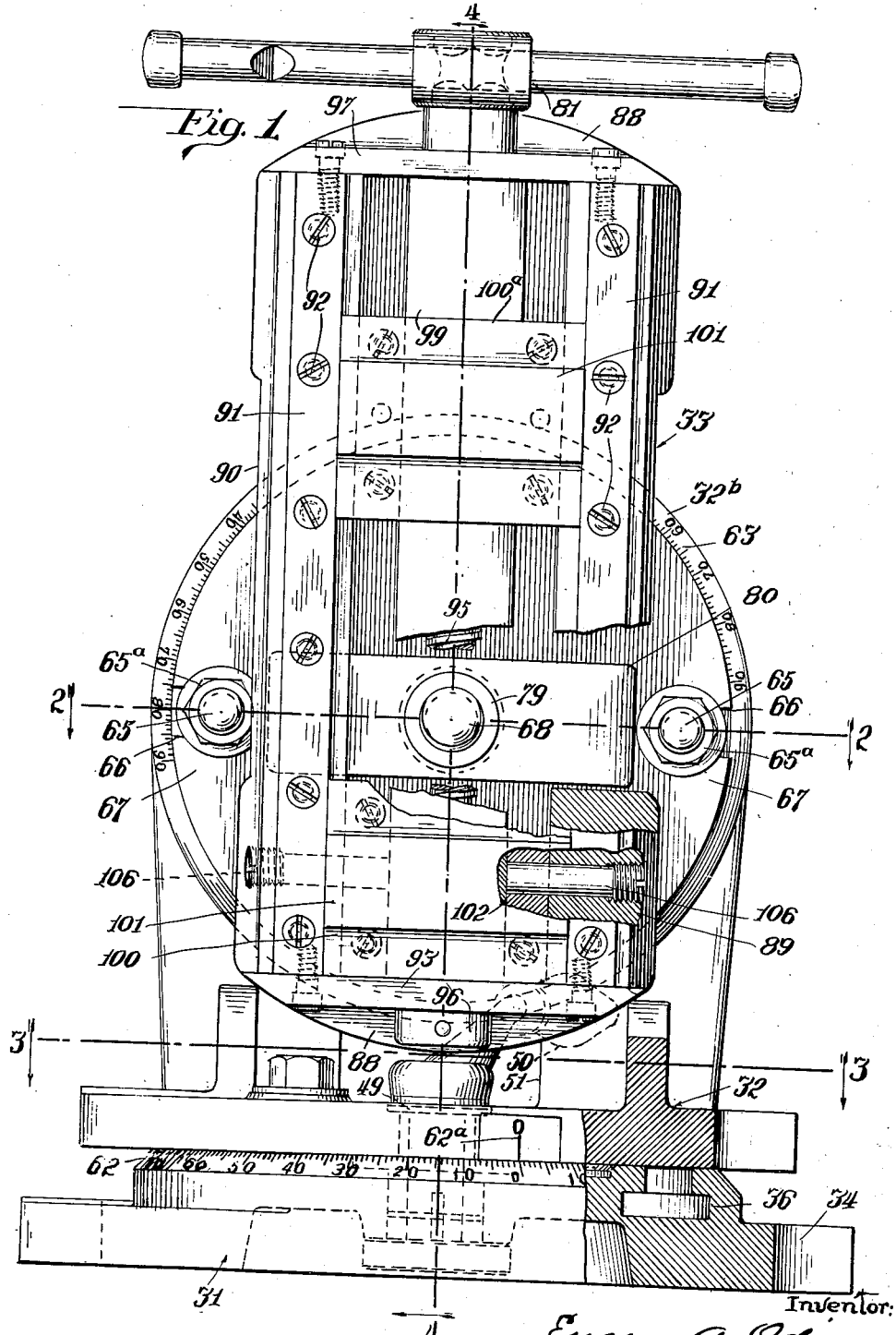
Figure 2:
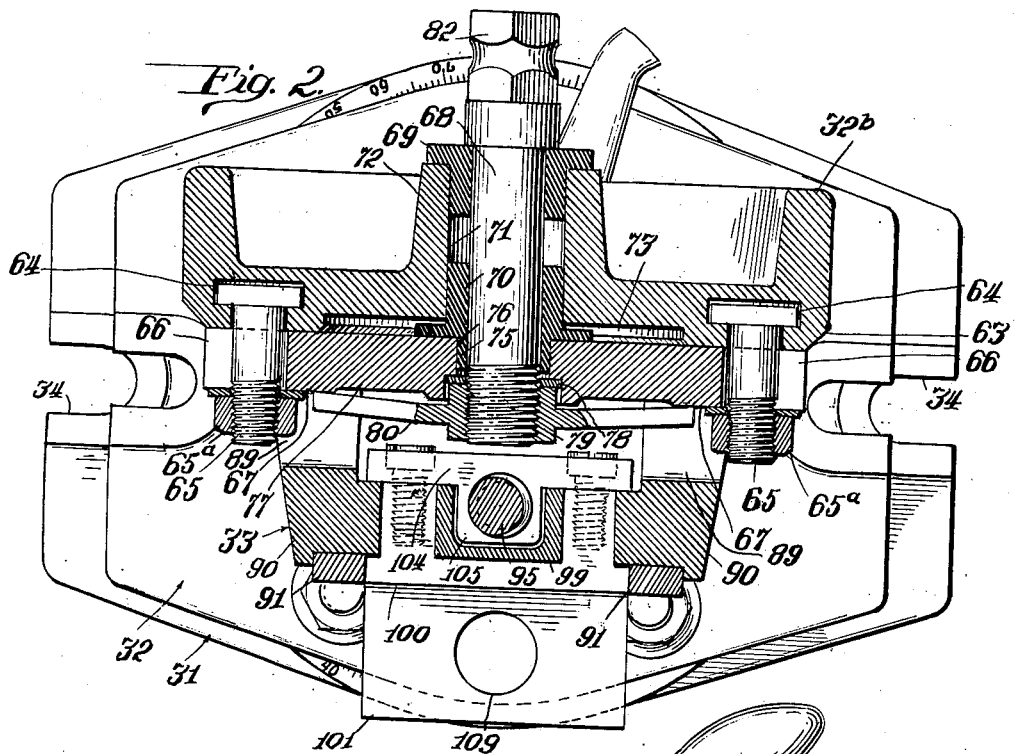
Figure 8:
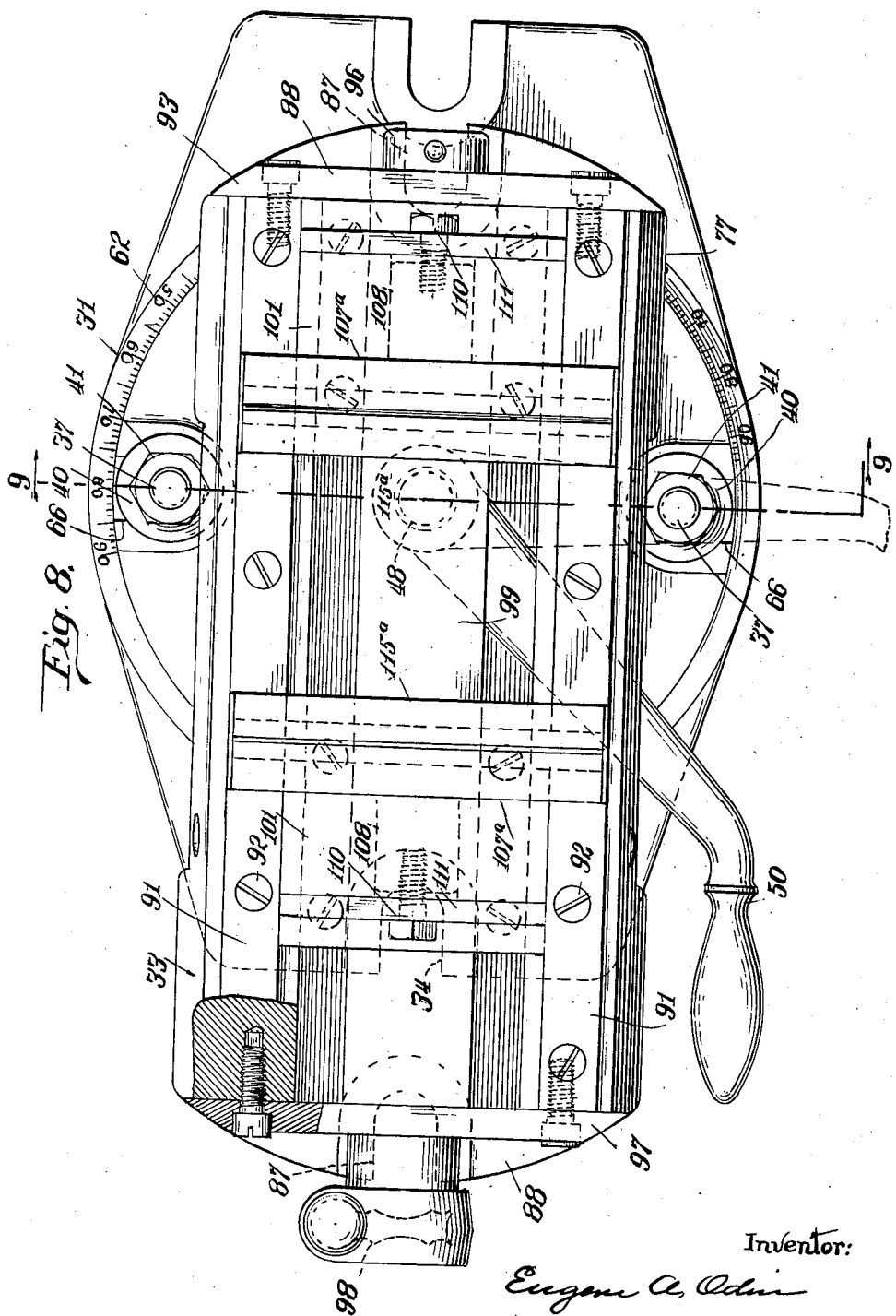
Fig. 8 is a top plan view of my apparatus differently adjusted from what is seen in Fig. 1 and with an intermediate portion omitted.

In carrying out my invention in its preferred form, I employ three main frame or supporting members, to wit, the swivel base 31, which may or may not have the intermediate universal angle piece 32 mounted to swivel thereon on a vertical axis, and which in turn has the vise base 33 swiveled thereon on a horizontal axis thereon, as shown in Figs. 1, 2 and 4, or I may swivel the vise base 33 directly on the base 31 on its vertical axis as seen in Figs. 8 and 9; and in either case the base 31 will be secured at any desired angle on the bed plate of the machine intended to work upon the article held in the vise. In some cases I may secure the vise base 33 directly on the bed plate of the machine, if the required adjustment does not necessitate the use of either of the members 31 and 32.

Figure 3:
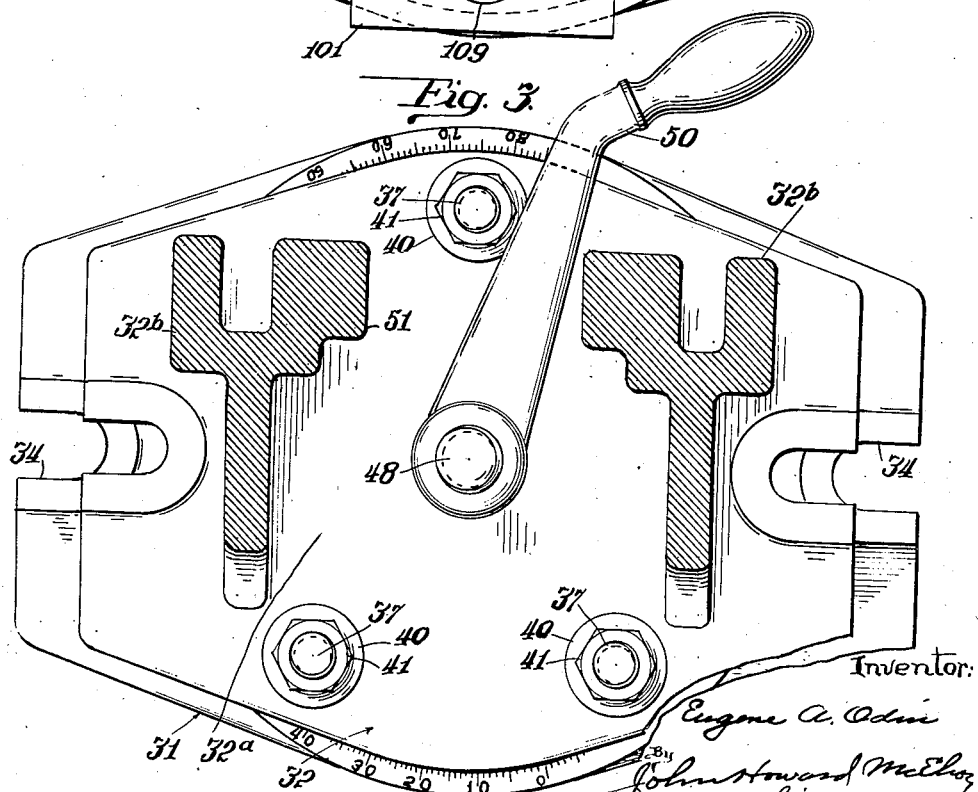

The swivel base 31 preferably takes the shape seen in plan view in Figs. 2, 3 and 8; and in central transverse section in Figs. 4 and 9. It has the U-shaped recesses 34 in its ends, each preferably surrounded by a slightly raised U-shaped portion upon which the nuts (not shown) used to clamp it by bolts (not shown) rest, the heads of which nuts will be held in the usual manner in the bed plate of the machine (not shown) upon which it is to be secured. It preferably has in it the circular under-cut channel 36 in which the heads of the bolts 37 (see Figs. 4 and 9) may be placed to secure the intermediate angle piece 32 in any desired adjustment upon the base 31, the bolts 37 extending upward through the U-shaped recesses 38, preferably bordered by the U-shaped raised portions 39 in the ends of the horizontal portion 32a of the angle piece 32, upon which raised portions the washers 40 rest held by the nuts 41 in the customary manner. The upper surface of the base 31 has the annular depression or recess 42 therein. If there is a tendency for the two members to contact only in the center and the parts yield, this serves to make the contact nearer to the outer edges which is desirable for the utmost accuracy.

The means to permit the accurate angular movement and adjustment of the intermediate angle piece 32 on the base 31 consists of the following mechanism: A tubular stud 43 (see Fig. 11) has the annular flange 44 through which the screws 45 pass into the adjacent underside of the horizontal portion 32a of the angle piece 32 to secure it thereto, the reduced upper end 46 extending into the stepped circular aperture 47 centrally located in said horizontal portion 32a. A bolt 48 (seen in Fig. 12), the circular head of which is preferably milled, extends up through the stud 43 through the washer 49, resting on the step in the aperture 47, and has threaded on its upper end the handle 50 extending through the rectangular aperture 51 in the vertical portion 32b of the angle piece 32.

A collar or ring 52 (see Fig. 13) through which the bolt 48 passes, is held between its head and bottom of the stud 43, it being compelled to rotate with the latter by the pin 53 secured in the collar and extended up into the aperture 54 formed in the larger bottom portion of the stud 43. The bolt 48 has the (preferably two) radial recesses 55 therein containing the pins 56, the rounded outer ends of which may be forced into the annular channel 57, semicircular in cross section, formed in the collar, by the beveled portion 58 of the adjustable locking member 59 (see Fig. 7) which has its lower end threaded into the axially extending bore formed in the bottom of the bolt 48. A hexagonal recess 61 in the bottom of the member 59 permits it to be turned by a tool 61a (see Fig. 5a) which is applied thereto after the parts have been assembled as shown in Fig. 4, to bring them into the position shown in Fig. 9 where the bolt 48 is held from turning in the hollow stud 43 by reason of the pressure of the outer ends of the pins 56 against the portions of the groove 57 which they engage when forced radially outward by the beveled portion 58 of the locking member 59 when it is screwed to the position shown. The pin 53 engaging the aperture 54 prevents the collar 52, now locked to the bolt 48, from turning relative to the angular piece 32 as the latter is adjusted relative to the base piece 31. While the parts are being initially assembled, the locking member 59 is not in place, so that the bolt 48 can be turned by its milled head relative to the member 32a to screw it far enough into the end of the lever 50 so that when the latter is turned through the 30 degree limit of its movement, as shown in Fig. 3, the parts 31 and 32 will be rigidly clamped together. Once the handle is in place and the angular piece 32 is properly adjusted on the base 31, turning the handle 50 through an angle of thirty degrees will lock them together or release them, depending upon which way it is swung. When thus adjusted at any desired angle, it may, if desired, be finally secured thereon by the bolts 37 and nuts 41, as shown in Fig. 9. To permit an accurate adjustment of the parts at any desired relative angle, I form the scale graduated to degrees on the inclined annular surface 62 (see Fig. 1) formed on the top of the base 31, and cooperating with a mark 62a on the edge of the horizontal portion 32a.

It will be understood that due to this small possible swing, 30 degrees, of the lever 50, the position of the bolt 48 will have to be slightly adjusted now and then to take up the slight wear between the moving parts that would be negligible if the lever could swing through any necessary number of degrees. By unscrewing the locking member 59, the bolt 48 can be turned up into the handle 50 as much as may be necessary to take up the wear, and then when the necessary adjustment is made, the member 59 is screwed back in place to lock the bolt 48 to the member 32, so that the latter can be released for adjustment merely by turning the lever 50 through its limited throw.

The angular piece 32 is L-shaped in vertical section, as seen in Fig. 4, and has a scale on the annular surface 63 formed on the inner face of the vertical portion similar to and for the same purpose as the scale on the angular surface 62. It preferably has the undercut annular channel 64 in the vertical portion 32b to receive the heads of bolts 65 passed through U-shaped recesses 66 in the edges of the circular portion 67 of the vise base 33 and the nuts 65a cooperate therewith to hold finally the vise base in any desired angular adjustment on the angle piece 32. The vise base 33 can of course be similarly finally held in any desired adjustment directly on the base 31 as shown in Fig. 8, the bolts 65 in that case being held in the under cut channel 36 previously described, and the scale 62 cooperating with a mark similar (not shown) to 62a but located on the edge of the vise base 33.

The vise base 33 is initially secured and held on the angular piece 32 by the novel mechanism now to be described and best shown in Figs. 1, 2 and 4. A bolt 68 turns in the bearings formed by the flanged collars 69 and 70 located in the outer and inner ends respectively of the bore 71 formed in the boss 72 located centrally with respect to the scale surface 63. The inner face of the vertical portion has the annular depression 73 therein for the same purpose as the depression 42 in the top of the base 31. The bearing collar 70 has a reduced portion 75 beyond its flange which extends into a stepped circular recess 76 in the base proper 77, a washer 78 being seated on the step and a nut 79 extending into the recess and engaging the washer. The nut 79 has formed integrally therewith or rigidly secured thereto an elastic bar 80 which is bowed slightly as seen in Fig. 2, and has its ends resting on the bottom (when used as seen in Figs. 1, 2 and 4) of the slot 74, and engaging frictionally the adjacent surface of the base 77. The head of the bolt 68 is adapted to have the wrench handle 81 (seen detached in Fig. 5) applied to the channeled hexagonal portion 82 thereof, and by turning it, the vise base 33 can be locked in any desired position on the angle piece 32. The use of the elastic bar 80 insures there being a tension on the bolt 68 at all times when angular adjustments are being made, thus holding the adjacent faces of the angle piece 32 and the vise base 33 together preventing chips or particles of dirt falling between them and thus destroying the accuracy of the unit. When finally adjusted they can be secured together by the bolts 65 as previously described.

To enable me to have this vise base 33 secured directly on the bed plate of the machine without using either the base 31 or the angle piece 32, I provide the U-shaped recesses 87 located at the ends of the base proper 77.

This base proper 77 of the vise base 33 has the generally rectangular shape seen in Figs. 1 and 8 with its ends 88 rounded and with the eccentric circular portion 67 previously mentioned extending from the sides near one end. At each corner is what I may call a supporting block 89, preferably integral with the base 77, and connecting them along the sides of 77 are the guide members 90, also preferably integral with 89 and shaped in cross section as seen in Figs. 2 and 9. The inner sides of these members, 90, form parallel ways as seen in said Figs. 2 and 9, and to prevent wear I preferably secure upon their upper adjacent surfaces the hardened steel bearing strips 91 held in place on plane surfaces by the screws 92. Connecting the supporting blocks 89 at the end nearest the circular portions 67 is the plate or bar 93 screwed thereto and having the boss 94 serving as a bearing for the screw 95 mounted to turn therein and held from longitudinal movement by the collar 96 pinned thereon as seen in Fig. 4. A similar plate or bar 97 is located at the other end and likewise serves as a bearing for the screw 95 which has a hexagonal channeled head 98 like that of the bolt 68 and adapted to have the handle 81 applied to it to turn it in its bearing. An inverted channel bar 99 secured at its ends to the bars 93 and 97 serves as a supporting member and protects the screw 95.

The stationary jaw supporting member 100, as seen in perspective in Fig. 10, is of an inverted T-shape in cross section along the length of the screw with a vertical portion 101 carrying the removable jaw as hereinafter explained. In transverse cross sections, its bottom part is of a channel shape formed by the downwardly projecting ribs 102 on either side of the channel bar 99 which it covers. Secured to the bottom of these ribs 102 by screws 103 is the plate 104 which has in its center the upwardly projecting portion or lug 105 in which the screw 95 merely turns. The corresponding projection 105a in the movable jaw supporting member 100a is internally threaded so that as the screw is turned, the member 100a will move on the guides formed by the inner faces of the members 90 and the bearing strips 91. The member 100, as seen in Figs. 1 and 4, is held in place by the stud set screws 106 (see Fig. 1) which pass through the blocks 89 into its ribs 102. The movable member 100a and its associated parts similarly numbered are identical with the member 100 except as above noted. By turning the screw 95, the jaws can be adjusted to clamp any desired work between them.

Various forms of jaws may be used with the members 100 and 100a, but all of them, as in the one form shown in place in Figs. 8, 9 and 10, have extending from the back of the jaw 107 a cylindrical lug 108 (shown in dotted lines in Fig. 8) adapted to fit at either end of the member 100. As these jaws can be inserted in either end of the bore 109, my vise can be used either to hold objects by clamping them between the jaws or by spreading them against the inner faces thereof. I preferably lock the jaws in place by setscrews 110 passed through a plate 111 preferably of the same surface dimensions as the back of the vertical portion 101 and threaded into an aperture formed in the end of the lug 108.

As the novel supporting mechanism is designed to be adjusted to bring the work supported thereby at any desired angle relative to the tool operating on it, it will be evident that where the adjustment is to be merely longitudinally along the bed-plate of a machine tool operating on the material held in the vise jaws, the members 31 and 32 are discarded, and the base piece 77 is secured at whatever point on the bed plate desired that may be possible from its construction by bolts, such as 37, projecting upwardly therefrom through the recess 87 and nuts 41 cooperating therewith. If it is desired to adjust it only at any desired angle relative to a vertical axis, the member 31 must be secured to the bed plate and the base piece 77 must be swiveled on it directly, as shown in Fig. 8, instead of through the intermediate member 32, as shown in Figs. 1, 2 and 4. In that case the handle 50, as seen in Fig. 9, extends through one of the two elongated rectangular apertures 74 formed in the sides of the vise base 33, as seen in Figs. 4 and 9, and bounded on their upper sides by the undersides of the guide members 90, and on their ends by the supporting blocks 89 and on their lower sides by the edges of the base proper 77. When this intermediate member is used, as shown in Figs. 1, 2 and 4, it will be obvious that the work can be held at any angle that may be desired, as it is at the same time adjustable about vertical and horizontal axes.

While I have herein shown and described a novel clamping means between the base and intermediate member, I do not herein claim the same, as I have made the same the subject of my divisional application No. 248,096, filed December 27, 1938.

What I claim as new and desire to secure by Letters Patent of the United States is:

1. In a universal supporting mechanism for machine tools, the combination with a base member provided with means for securing it to a machine bed, of an intermediate member removably mounted to turn thereon for adjustment with a vertical axial member, said vertical axial member extending through said base and intermediate members, a final member removably mounted to turn on the intermediate member for adjustment about a horizontal axial member, said horizontal axial member extending through said intermediate and final members and removable therefrom, the mountings between the base member and the intermediate member, and the intermediate member and the final member, being interchangeable, so that the intermediate member and the horizontal axial member can be omitted and the final member mounted to rotate on the base member about said vertical axial member, nuts cooperating with said axial members which must be loosened to permit adjustments of the intermediate and final members relative to the base and intermediate members, and means for securing the members against any possible movement in any desired adjustment.

2. In a universal supporting mechanism for machine tools, the combination with a base member, of an intermediate member removably mounted to turn thereon for adjustment with a vertical axial member, said vertical axial member extending through said base and intermediate members, a final member removably mounted to turn on the intermediate member for adjustment about a horizontal axial member, said horizontal axial member extending through said intermediate and final members and removable therefrom, nuts cooperating with said axial members which must be loosened to permit adjustments of the intermediate and final members relative to the base and intermediate members, and means for securing the members against any possible movement in any desired adjustment consisting of undercut annular channels in the base member and in the intermediate member, said channels concentric with their respective axial members, and the intermediate and final members each having recesses through which bolts held in the grooves of the associated members may pass in any relative adjustment thereof.

3. In a universal supporting mechanism for machine tools, the combination with a base member, of an angular intermediate member removably mounted to turn thereon for adjustment with a vertical axial member and having two bearings therethrough set at right angles to each other, said vertical axial member extending through said base and intermediate members, a final member removably mounted to turn on the intermediate member for adjustment about a horizontal axial member, said horizontal axial member extending through said intermediate and final members and removable therefrom, nuts cooperating with said axial members which must be loosened to permit adjustments of the intermediate and final members relative to the base and intermediate members, and means for securing the members against any possible movement in any desired adjustment, the intermediate member being right angular in cross section through its two bearings.

4. In a universal supporting mechanism for machine tools, the combination with a base member provided with means for rigidly securing it to a support, of an axial member associated therewith and extending upwardly therethrough, an intermediate member having a central bearing aperture to cooperate with the axial member with which it can be adjusted to any desired position, a second axial member extending through said intermediate member at right angles to the axis of said central bearing aperture, a final member having a bearing aperture to cooperate with said second axial member and about which said final member may be adjusted to any desired position, said bearing apertures and said axial members having the same cooperating dimensions so that the intermediate member may be omitted when desired, and the final member adjusted in any desired position on the base member, nuts cooperating with said axial members which must be loosened to permit adjustments of the intermediate and final members relative to the base and intermediate members, and means for securing said members against any possible movement in any desired adjustment.

5. A universal supporting mechanism as described in claim 4 in which each of the axial members consists of a boltlike structure passing through both of the members which it unites, and in which the nut for the intermediate member is provided with spring extensions which limit its turning movement, and the bolt can be turned to tighten the grip of the nut and bolt on the two members.

EUGENE A. ODIN.